Jan. 22, 1935.  L. FERENCI  1,988,486
PHOTO-ELECTRIC WEB REGISTERING DEVICE
Filed Feb. 25, 1931
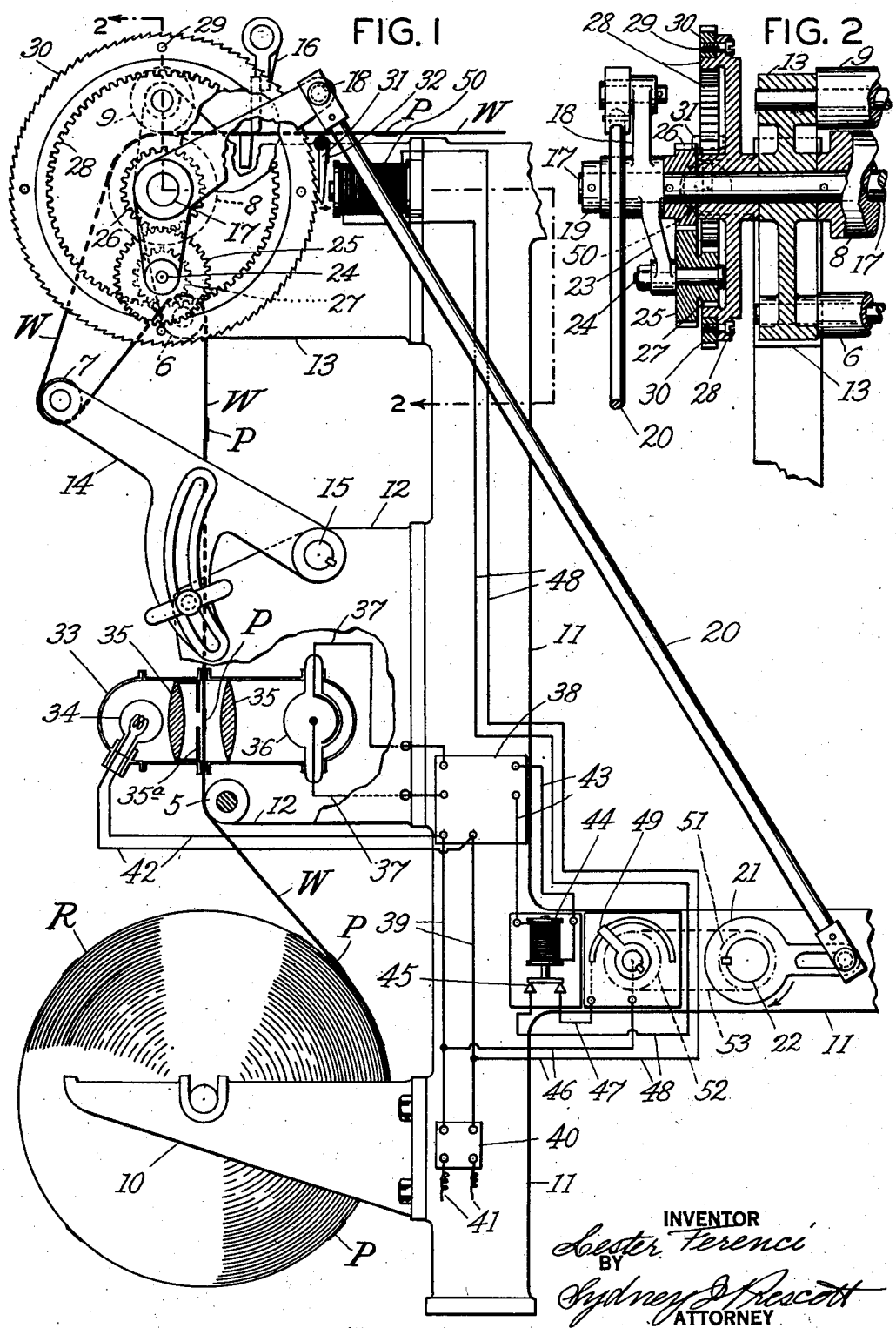
INVENTOR
Lester Ferenci
BY
Sydney J. Prescott
ATTORNEY Patented Jan. 22, 1935

1,988,486

UNITED STATES PATENT OFFICE 1,988,486

PHOTOELECTRIC WEB-REGISTERING DEVICE

Lester Ferenci, Brooklyn, N. Y., assignor to American Machine & Foundry Company, a corporation of New Jersey Application February 25, 1931, Serial No. 518,283

11 Claims. (Cl. 271—2.6)

This invention relates to web-registering devices for wrapping machines, its main object being to synchronize the feeding and cutting of wrapping material having a recurrent opaque label or pattern printed thereon, so that the cuts have a predetermined relation to the recurrent labels.

This object in the present invention is achieved by feeding the web of wrapping material past a photoelectric cell in such a manner that the rays falling into the cell from a source of light are affected by the recurrent opaque labels. In the case of transparent or translucent wrapping material, the web is fed between the source of light and the photoelectric cell, the light from the source being obstructed when a portion having an opaque label passes between the source of light and the cell; and, in the case of opaque wrapping material, the cell and source of light are placed on the same side of the traveling web, the light reflected from the web into the photoelectric cell changing in quantity when a labeled portion is met. The current of the photoelectric cell, after passing through a suitable amplifier, energizes a relay so that the decreased current produced in the photoelectric cell by the passage of a label causes the closing of the circuit of an electromagnet which is opened after an interval of time by a rotary switch, the said electromagnet when so energized causing the movement of a suitable device for stopping the web feed. With these and other objects not specifically mentioned in view, the invention consists in certain constructions and combinations which will be hereinafter fully described and then specifically set forth in the claims hereunto appended.

In the accompanying drawing which forms a part of this specification and in which like characters of reference indicate the same or like parts:

Fig. 1 is a side elevation of a web feed equipped with an automatic registering device according to the present invention; and Fig. 2 is a sectional rear elevation of the web feeding mechanism, taken on line 2—2 of Fig. 1.

In carrying the invention into effect there is provided means for feeding a web of wrapping material having a recurrent opaque label or pattern thereon, a source of light arranged to project light onto said web, a photoelectric cell arranged to be illuminated by the light projected onto said web, and means controlled by said cell for incapacitating said web-feeding means and then rehabilitating it after an interval of time. In the best constructions contemplated, the web-feeding means includes a feed roller having a shaft on which is mounted a sun gear, an internal gear provided with an external ratchet engaged by a pawl, and an oscillating crank carrying planet gears meshing with said sun gear and internal gear respectively. In the preferred form of construction, the means for incapacitating and rehabilitating the web-feeding means includes a relay and an amplifier connected to the photoelectric cell, an electric circuit adapted to be closed by a contact supported by said relay when the light is projected onto the labelled portion of the web, and including an electromagnet adapted to release said pawl when the circuit is closed, and a rotary switch for opening the circuit after an interval of time.

Referring to the drawing, R is a reel of transparent or translucent wrapping material having a recurrent opaque label or pattern P thereon, the web W passing over rollers 5, 6 and 7 onto the main feed roller 8 against which it is held by a roller 9. The reel R is supported in brackets 10 attached to the frame 11 of the wrapping machine. The rollers 5 and 6 are stationary being journaled in brackets 12 and 13, respectively, attached to frame 11, bu' the roller 7 is movable by adjustable arms 14 mounted on shaft 15 supported in brackets 12, this adjustability enabling the setting of the web so that the labels thereon have the proper position with respect to a knife 16 for cutting the same.

The feed roller 8 is fixedly mounted on shaft 17 which is intermittently driven through planetary gearing by a crank 18 loosely mounted on shaft 17 and held thereon by a collar 19. The crank 18 is actuated by a connecting rod 20 from a crank 21 on main shaft 22 which makes one revolution for each cycle of the wrapping machine. An arm 23 of crank lever 18 carries a stud 24 on which turns a double planet gear 25, one face of which meshes with a sun gear 26 fast on shaft 17 while the other face 27 engages with an internal gear 28 loose on shaft 17. To the internal gear 28 is fastened, by means of screws 29, a ratchet 30 with which engages a pawl 31 pivoted on bracket 13 and held in engagement therewith by a leaf spring 32. As long as the ratchet 30 is held stationary by its engagement with pawl 31, a clockwise motion of crank 21 will produce a forward motion of web W through the then stationary internal gear 28, but when pawl 31 is disengaged, the internal gear 28 is free to move so that the motion of crank 18 will not be transmitted to the sun gear 26 and the feed roller 8 will stop.

The web W by the rollers 5 and 6 is fed through a housing 33 held by brackets 12, the said housing containing a source of light such as an electric lamp 34 which through lenses 35 on either side of web W and a slit in the wall 35a illuminates a photoelectric cell 36 of well known construction. Wires 37 connect the cell 36 with an amplifier 38, also of well known construction, which receives current through wires 39 from a switch 40 connected by wires 41 to a source of electric current. Wires 42 connecting with wires 39 supply current to the electric lamp 34. From the amplifier 38 the current from the photoelectric cell is led by wires 43 to a relay 44 which is thereby energized with sufficient strength to hold its contact 45 open as long as a transparent or translucent portion of the web W passes between the lenses 35. But when one of the labels on web W intervenes between the lamp 34 and the photoelectric cell 36, and the light from lamp 34 is thereby obstructed, the resultant weakened current is no longer able to hold contact 45 of relay 44 open, thus causing current from wires 39 to flow through wires 46, 47 and 48 and rotary switch 49 into electromagnet 50 which attracts pawl 31 and thereby stops the web W at the predetermined distance of the printed label from the knife 16. The rotating switch 49, driven by gears 51 and 52 and chain 53 from the main shaft 22, is so set that contact persists from some time before until some time after the cutting period of knife 16, whereupon the current through electromagnet 50 is broken automatically by switch 49, thereby allowing the pawl 31 to reengage with ratchet 30 and thus to restart the feed of the web W.

What is claimed is:

1. In a web-registering device, the combination with a support for a reel of wrapping material having a recurrent opaque label or pattern thereon, of means for intermittently pulling off material from said reel in a continuous web, a source of light arranged to project light onto said web, a photoelectric cell arranged to be illuminated by the light projected onto said web, mechanism controlled by said cell for incapacitating said web-feeding means, and a device for rehabilitating it after an interval of time.

2. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means, and a device for rehabilitating it after an interval of time, said means including a pair of cooperating web feeding rollers and a planetary gear drive for one of said rollers.

3. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means, and a device for rehabilitating it after an interval of time, said means including a shaft, a web feeding roller mounted on said shaft, a sun gear fixed on said shaft, an internal gear rotatably mounted on said shaft, a crank loosely mounted on said shaft, a crank drive for oscillating said crank, and planet gears meshing with said internal and sun gears respectively and supported by said crank.

4. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means and a device for rehabilitating it after an interval of time, said means, including a shaft, a web feeding roller mounted on said shaft, a sun gear fixed on said shaft, an internal gear rotatably mounted on said shaft and provided with an external ratchet, an oscillating crank loosely mounted on said shaft, planet gears supported by said crank and meshing with said sun gear and internal gear respectively, and a spring pressed pawl engaging said ratchet, whereby oscillation of said crank will intermittently rotate said feed roller in one direction.

5. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means and a device for rehabilitating it after an interval of time, said mechanism including an amplifier and a relay connected to said cell, an electric circuit including an electromagnet and a rotary switch, and a contact supported by said relay and adapted to close said circuit when the light is projected onto the labelled portion of the web, whereby said electromagnet will be energized and the rotary switch will open said circuit after an interval of time.

6. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means, and a device for rehabilitating it after an interval of time, said means including a ratchet and a spring pressed pawl engaging said ratchet, and said mechanism including an electromagnet adapted to release said pawl when energized.

7. In a web-registering device, the combination with means for feeding a web of wrapping material having a recurrent opaque label or pattern thereon, of a source of light arranged to project light onto said web, a photoelectric cell arranged to be illuminated by the light projected onto said web, mechanism controlled by said cell for incapacitating said web-feeding means, and a device for rehabilitating it after an interval of time, said source of light including an electric lamp arranged on one side of said web, and said photoelectric cell being disposed on the other side of said web, whereby the labelled portion of the web will obstruct the light projected from said lamp onto said web.

8. In a web-feeding device, the combination with means for feeding a web, of mechanism for causing said means to stop feeding the web, said means including a shaft, a web feeding roller mounted on said shaft, a sun gear fixed on said shaft, an internal gear rotatably mounted on said shaft and provided with an external ratchet, an oscillating crank loosely mounted on said shaft, planet gears supported by said crank and meshing with said sun gear and internal gear respectively, and a spring pressed pawl engaging said ratchet.

9. Means for intermittently feeding a web of wrapping material, comprising a pair of cooperating feed rollers, a shaft carrying one of said rollers, an oscillating crank loosely mounted on said shaft, a sun gear fixed on said shaft, an internal gear rotatably mounted on said shaft and provided with an external ratchet, planet gears supported by said crank and meshing with said sun gear and internal gear respectively, and a spring pressed pawl engaging said ratchet.

10. In a web-registering device, the combination with means for feeding a web of wrapping material having thereon a recurrent pattern, of optical characteristics substantially different from the remainder of the web, a source of light arranged to project light onto said web and the patterns thereon, a photo-sensitive device arranged to be illuminated by the light projected on said web and patterns, and mechanism controlled by said device acting on said web feeding means to stop the web when a pattern on the web reaches a predetermined position, and an adjustable take-up acting on the web between the discharge end of said feeding means and said device to vary the length of web there-between and thereby adjust the position of the pattern relative to said discharge end.

11. In a web-registering device, the combination with a support for a reel of wrapping material having thereon a recurrent pattern, of optical characteristics substantially different from the remainder of the web, of means for intermittently pulling off wrapping material from said reel in a continuous web, a source of light arranged to project light onto said web and the patterns thereon, a photo-sensitive device arranged to be illuminated by the light projected on said web and patterns, and mechanism controlled by said device acting on said web feeding means to stop the web when a pattern on the web reaches a predetermined position, and means periodically operating to start the stopped web.

LESTER FERENCI.